May 18, 1965  W. H. RAMSDELL  3,183,728
UNIT PUMPER
Filed Aug. 6, 1962  2 Sheets-Sheet 1
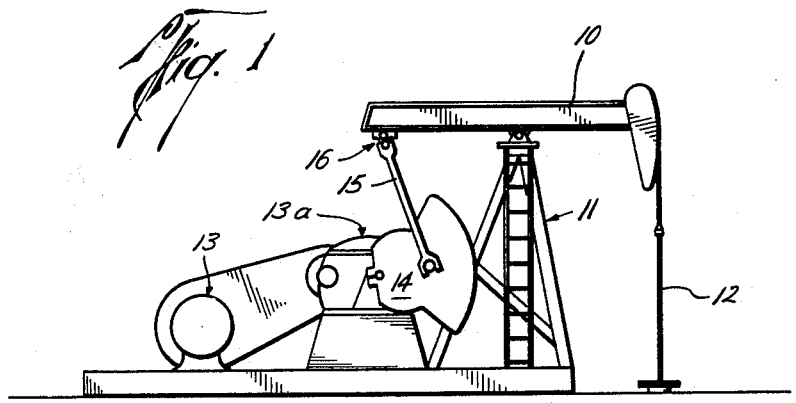
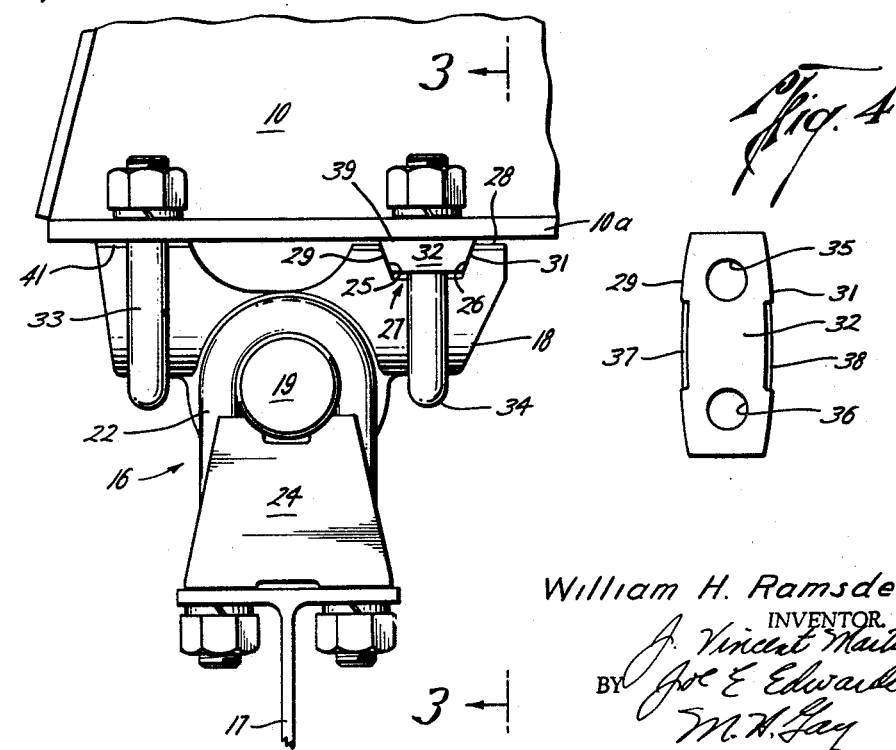
William H. Ramsdell
INVENTOR.
BY
ATTORNEYS

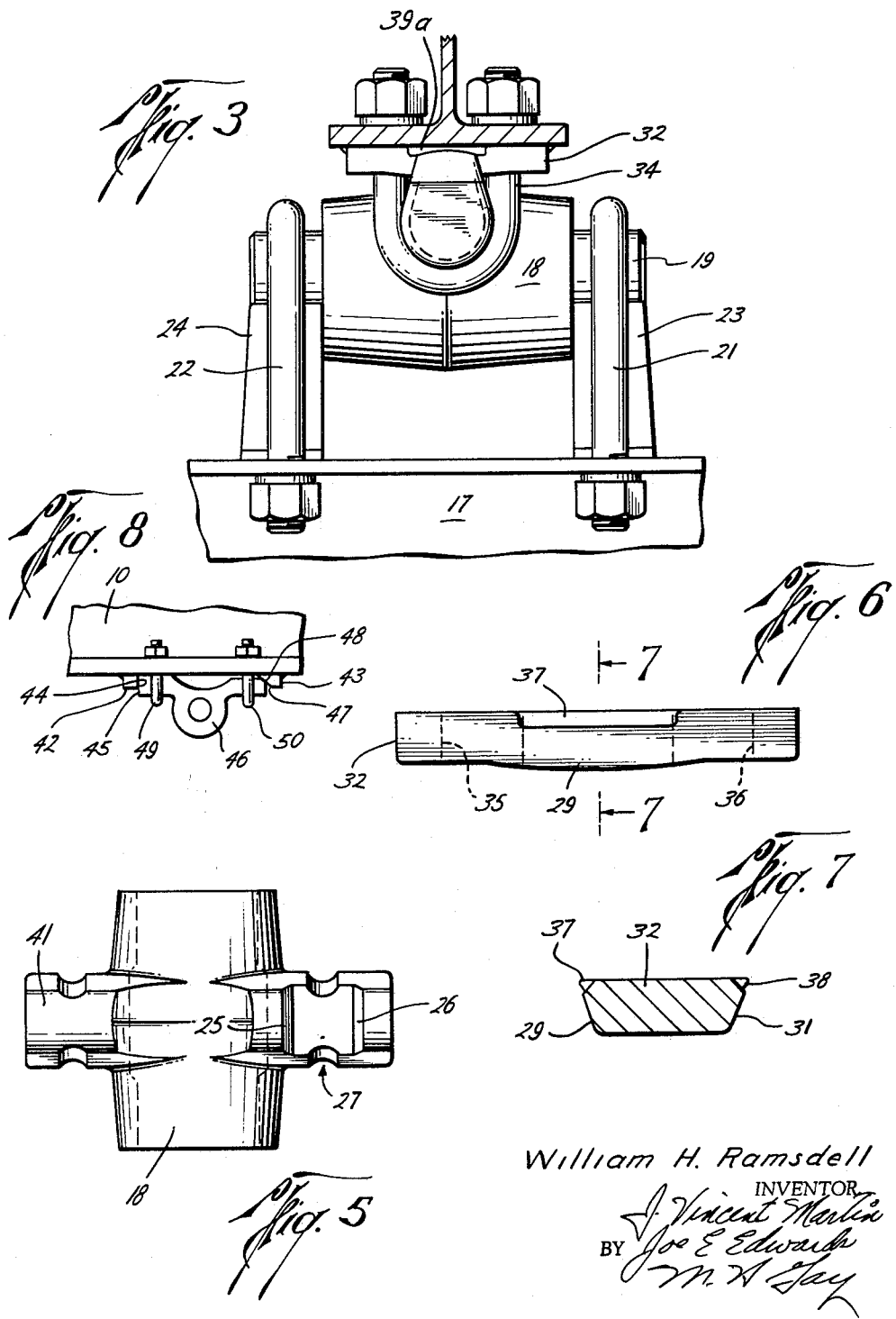

United States Patent Office 3,183,728
Patented May 18, 1965

3,183,728
UNIT PUMPER
William H. Ramsdell, Houston, Tex., assignor to The Youngstown Sheet and Tube Company, Youngstown, Ohio, a corporation of Ohio
Filed Aug. 6, 1962, Ser. No. 215,131
4 Claims. (Cl. 74—41)

This invention relates to pumping units used in the oil fields to operate pumps.

Unit pumpers have been used for many years to reciprocate sucker rods in wells and lift oil from thousands of feet below the surface. The load imposed on the pumper unit is very substantial and their general construction is one of ruggedness to permit continuous field service without interruption.

Notwithstanding the need for unit pumpers which do not require maintenance service, a persistent problem has existed in the connection of the pitman to the walking beam.

Power is delivered to the pitman through a crank arm, and there of course results a changing distribution of forces applied to the walking beam. When the crank arm extends generally parallel to the walking beam, a force is applied to the connection between the pitman and walking beam in a direction parallel to the walking beam. This force is applied in a direction normal to the bolts which conventionally attach the bearing assembly on the end of the pitman to the walking beam. It has been found that this force is the cause of the tendency of these bolts to work loose.

In the past blocks or abutments have been secured to the walking beam immediately adjacent the bearing assembly in an attempt to permit the transmission of the lateral force identified above directly from the bearing assembly to such block. It was found to be virtually impossible to obtain zero clearance in assembling the unit, and therefore the block idea was discarded. In a further attempt to solve the problem the blocks described above were provided with set screws which extended through the block and engaged the bearing assembly after the assembly had been firmly secured to the walking beam. It was found that these set screws tended to work loose and did not give a practical solution to the problem.

It is an object of this invention to provide a releasable connection between the pitman and a walking beam of a unit pumper which does not tend to work loose due to forces transmitted through the pitman which are not perpendicular to the walking beam.

Another object is to provide a releasable connection between the pitman and walking beam of a unit pumper which does not transmit lateral forces from the pitman to the walking beam through the bolts which connect the bearing assembly on the end of the pitman to the walking beam.

Another object is to provide an abutment on a walking beam which is engaged by the bearing assembly on the end of the pitman of a unit pumper which has zero clearance and which permits limited adjustment of the bearing assembly relative to the walking beam.

Other objects, features and advantages of the invention will be apparent from the drawings, the specification and the claims.

In the drawings, wherein like reference numerals indicate like parts, and wherein illustrative embodiments of this invention are shown:

FIGURE 1 is a view in elevation of a unit pumper embodying this invention;

FIGURE 2 is a fragmentary view on an enlarged scale of the connection between the walking beam and bearing assembly of the structure of FIGURE 1;

FIGURE 3 is a view along the lines 3—3 of FIGURE 2;

FIGURE 4 is a view of the wedge member employed in the embodiment of the invention of FIGURE 2 viewed from above in the FIGURE 2 position;

FIGURE 5 is a view of the bearing housing of FIGURE 2 viewed from above;

FIGURE 6 is a side elevational view of the wedge member shown in FIGURE 4;

FIGURE 7 is a view along the lines 7—7 of FIGURE 6; and,

FIGURE 8 is a fragmentary view of a walking beam and a bearing housing illustrating a modified form of this invention.

In carrying out this invention the bearing assembly and the walking beam are provided with wedge surfaces which extend laterally to the walking beam and which are drawn into zero clearance by the bolts when the bearing housing is secured to the walking beam.

In the preferred form of unit pumper, a walking beam 10 is mounted on a Samson post indicated generally at 11 for reciprocating sucker rod 12.

Power is provided for the unit pumper by a prime mover indicated generally at 13. The output of the prime mover is connected to a pair of crank arms 14 through a speed reducer 13a. The crank arms 14 are connected to a pair of pitmans 15 which in turn are connected to the walking beam 10 by a bearing assembly indicated generally at 16. The form of unit pumper shown in FIGURE 1 is probably the form most generally in use today, but it will be understood that other forms of pumpers may advantageously incorporate this invention.

FIGURE 2 illustrates details of the connection between the pitmans 15 and walking beam 10. The connection will usually employ an equalizing bar, a fragment of which is shown at 17, to equalize the application of force from speed reducer 13a; it being understood that a second crank arm 14 and a second pitman 15 are provided on the other side of speed reducer 13a of FIGURE 1.

The means for connecting the pitman to the walking beam also includes a bearing housing 18 in which a stub shaft 19 is mounted for rotation. Preferably, the assembly includes a pair of U-bolts 21 and 22 and suitable spacers 23 and 24. The U-bolts wrap around the stub shaft 19 and are secured to the equalizer bar with the spacers 23 and 24 held between the equalizer bar and stub shaft 19.

The bearing assembly 16, and more particularly the bearing housing 18, is provided with first and second surfaces 25 and 26 which extend generally transversely of the walking beam. These surfaces are preferably formed by a groove indicated generally at 27 in the face 28 of bearing housing 18 which confronts the walking beam 10. Preferably, the side walls 25 and 26 diverge outwardly of the groove.

The walking beam is provided with surfaces for engaging surfaces 25 and 26 on the bearing housing. These surfaces extend laterally of the walking beam and preferably are provided by surfaces 29 and 31 on wedge member 32. Surfaces 29 and 31, respectively, engage surfaces 25 and 26 in the groove in the bearing housing. The wedge member 32 may be secured to the walking beam 10 in any desired manner as by welding.

Preferably, both side walls 29 and 31 of wedge member 32 converge in a direction away from the walking beam to engage the side walls 25 and 26 of groove 27.

Suitable bolts are used to secure the bearing housing to the walking beam, such as U-bolts 33 and 34. These U-bolts wrap around the bearing housing and extend through the lower flange 10a of the walking beam 10.

For convenience of manufacture and assembly, U-bolt 34 extends through holes 35 and 36 in wedge member 32.

It will be noted from FIGURE 2 that the portion of the bearing housing 18 to the left of stub shaft 19 fully abuts the underside of walking beam 10. On the other hand, the confronting face 28 of the bearing housing adjacent U-bolt 34 is spaced from the walking beam 10 by the engagement of the wedge block with the groove 27. Thus, when the bearing assembly is secured to the walking beam 10, the surfaces 25 and 26 engage surfaces 29 and 31 on the wedge block, respectively, with zero clearance. As the wedge block is firmly secured to the walking beam, forces from the pitman which are other than perpendicular to U-bolts 34 will be transmitted to the walking beam from the bearing housing 18 through the wedge block 32, thus relieving the lateral stresses normally present on U-bolts 33 and 34 which in the past have generated a tendency for these U-bolts to loosen.

Preferably, at least one of each pair of surfaces 25 and 29, as well as one surface of each pair of surfaces 26 and 31, is formed convex in a direction permitting variations in alignment of the bearing assembly and walking beam. For convenience of manufacture, the surfaces 29 and 31 on wedge member 32 may be formed convexly in a direction perpendicular to the direction of convergence of surfaces 29 and 31, as best shown in FIGURE 4. With surfaces 25 and 26 formed in straight planes, as shown in FIGURE 5, a line contact will result in each pair of surfaces, permitting variations in alignment of the bearing assembly and walking beam. This structure permits zero clearance between the surfaces on the wedge and the surfaces on the bearing housing 18, while at the same time permitting freedom in alignment of the bearing housing with the walking beam.

Preferably, the wedge 32 is welded to flange 10a of walking beam 10 with a continuous weld about the periphery of wedge 32. In order to prevent the possibility of interference of weld metal with the engagement of surfaces 25, 26, 29 and 31, the wedge 32 is undercut at 37 and 38 in the area underlying the bearing housing 18. This permits the weld metal 39a of continuous weld 39 to be deposited inwardly of the wedge surfaces 29 and 31 on wedge 32.

To further permit variations in alignment of the bearing housing and walking beam, it will be noted that the surface 41 of bearing housing 18 which abuts walking beam 10 is convex. This feature, in combination with the convex surfaces 29 and 31 of wedge 32, permits variations in alignment of shaft 19 in two dimensions to prevent unnecessary stresses from being applied to the connection between the pitman and the walking beam.

Reference is made to FIGURE 8 in which a modified form of this invention is shown which illustrates the fact that only a single pair of wedge surfaces is necessary. In this instance the walking beam 10 has a pair of spaced blocks 42 and 43 welded thereon. Block 42 has a straight surface 44 which engages a straight surface 45 on bearing housing 46. The block 43 has a wedge surface 47 which engages a wedge surface 48 on bearing housing 46. As the U-bolts 49 and 50 pull the bearing housing 46 into tight engagement with the walking beam, the action of wedge surfaces 47 and 48 drives the bearing housing into firm engagement with block 42, thus providing zero clearance between the bearing housing and two blocks 42 and 43 to permit the transmission of lateral forces from the bearing housing to the walking beam through the blocks 42 and 43.

From the above it will be apparent that it is preferred to utilize the form of FIGURES 1 through 7 of this invention, as only a single block need be welded or otherwise fastened to the walking beam. From the FIGURE 8 form of this invention it will be apparent that the wedge 32 might have only one wedge surface thereon instead of two. Two surfaces are preferred, however, as this gives a relatively large total wedge angle (the total of both surfaces) with relatively steep wedge surfaces.

The foregoing disclosure and description of the invention is illustrative and explanatory thereof and various changes in the size, shape and materials, as well as in the details of the illustrated construction, may be made within the scope of the appended claims without departing from the spirit of the invention.

What is claimed is:

1. A unit pumper comprising,
    a Samson post,
    a walking beam mounted on the Samson post,
    a motor,
    crank arm means driven by said motor,
    pitman means connected to the crank arm means, and
    means connecting the pitman means to the walking beam including a bearing assembly secured to the walking beam by bolts, said bearing assembly having first and second surfaces extending transversely of the walking beam, said walking beam having third and fourth surfaces engaging said first and second surfaces, respectively, at least one pair of said engaging surfaces extending at a wedge angle relative to the other pair of surfaces and providing wedge surfaces urging said engaging surfaces into firm contact whereby forces can be transmitted therethrough to reduce the tendency of said bolts to work loose, at least one surface of each pair of said wedge angle surfaces being convex in a direction extending transversely of the walking beam to permit variations in alignment of the bearing assembly and walking beam.

2. A unit pumper comprising,
    a Samson post,
    a walking beam mounted on the Samson post,
    a motor,
    crank arm means driven by said motor,
    pitman means connected to the crank arm means, and
    means connecting the pitman means to the walking beam including a bearing assembly secured to the walking beam by bolts, said bearing assembly having first and second surfaces extending transversely of the walking beam, said walking beam having third and fourth surfaces engaging said first and second surfaces, respectively, said engaging surfaces converging and providing wedge surfaces urging said engaging surfaces into firm contact whereby forces can be transmitted therethrough to reduce the tendency of said bolts to work loose, at least one of said pair of surfaces on the bearing assembly and said pair of surfaces on the walking beam being convex in a direction transverse of the walking beam to permit variations in alignment of the bearing assembly and walking beam.

3. A unit pumper comprising,
    a Samson post,
    a walking beam mounted on the Samson post,
    a motor,
    crank arm means driven by said motor,
    pitman means connected to the crank arm means,
    means connecting the pitman means to the walking beam including a bearing housing secured to the walking beam by bolts, said bearing housing having a groove in the face thereof confronting the walking beam, the side walls of said groove diverging outwardly, and
    a wedge member secured to the walking beam between the walking beam and bearing housing, said wedge member having surfaces converging in a direction away from the walking beam and engaging said side walls of said groove, at least one of said pair of surfaces on the wedge member and said pair of surfaces provided by the side walls of said groove being convex to permit variations in alignment of the pitman means and walking beam.

4. A unit pumper comprising,
a Samson post,
a walking beam mounted on the Samson post,
a motor,
crank arm means driven by said motor,
pitman means connected to the crank arm means,
means connecting the pitman means to the walking beam including a bearing housing secured to the walking beam by bolts, said bearing housing having a groove in the face thereof confronting the walking beam, the side walls of said groove diverging outwardly, said face confronting the walking beam being convex in a direction transverse of the walking beam, and
a wedge member secured to the walking beam between the walking beam and bearing housing, said wedge member having surfaces converging in a direction away from the walking beam and engaging said side walls of said groove, said wedge surfaces curving convexly in a direction perpendicular to the direction of convergence of said wedge surfaces to permit variations in alignment of the bearing housing and walking beam.

References Cited by the Examiner

UNITED STATES PATENTS

| | | | |
|---|---|---|---|
| 1,799,160 | 4/31 | Franks. | |
| 2,092,180 | 9/37 | Porter | 74—41 |
| 2,268,650 | 1/42 | Eaton | 74—41 |
| 3,005,353 | 10/61 | Gallaway | 74—41 |

OTHER REFERENCES

German application June 11, 1959, DAS 1,059,018.

BROUGHTON G. DURHAM, *Primary Examiner.*